Patented Feb. 23, 1937

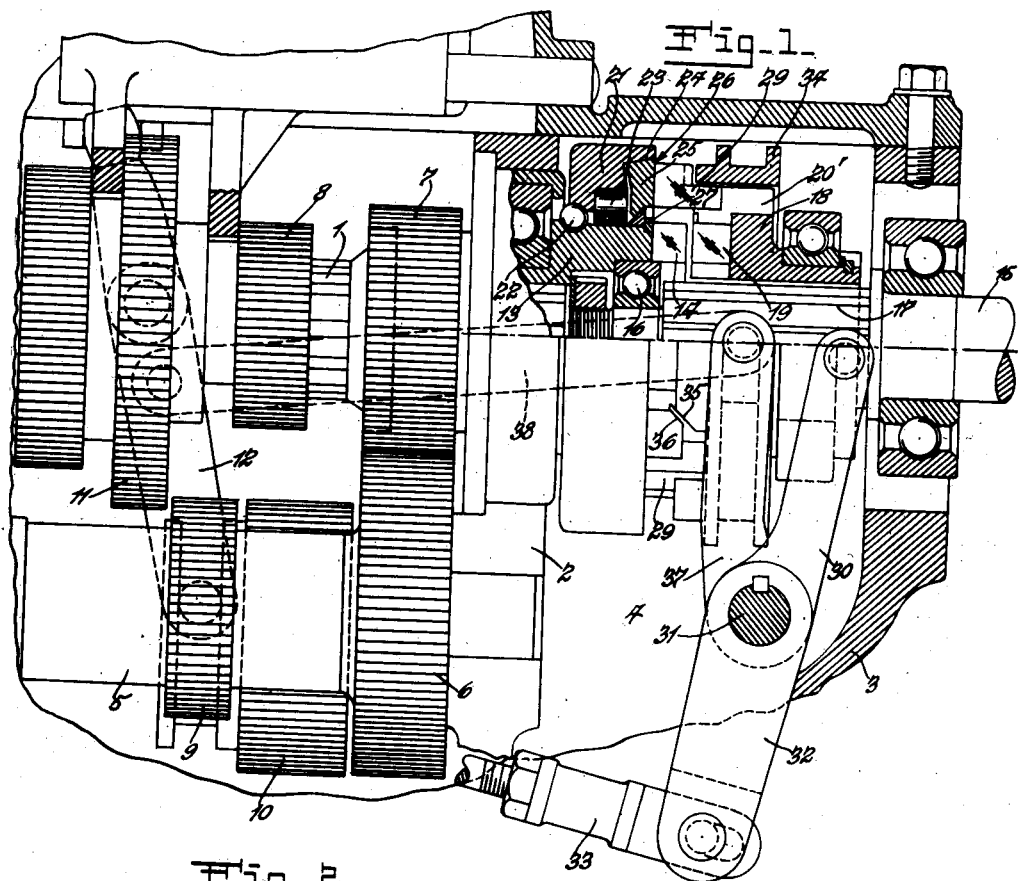

2,071,582

UNITED STATES PATENT OFFICE 2,071,582

POWER TRANSMISSION MECHANISM

Piero Mariano Salerni, Westminster, England

Original application August 1, 1932, Serial No. 627,196. Divided and this application October 18, 1935, Serial No. 45,581. In Great Britain August 13, 1931

6 Claims. (Cl. 192—67)

This application is a division of my application for Power transmission mechanism Serial No. 627,196, filed August 1, 1932, and relates to clutches of the positive interengaging type.

One of the objects of my invention is to produce a positive clutch device embodying improved means for preventing engagement of the teeth thereof until the driving and driven elements of the clutch have attained substantially synchronous speeds.

A more specific object is to provide a balking means for preventing one of the elements of a positive clutch from engaging the other element until the elements are substantially synchronized, the balking means being controlled by the other element through a one-way driving connection and a friction connection whereby the balking means will only be operated when substantial synchronism is attained and injury to the balking means and its controlling connection is prevented in the event the elements of the clutch do not engage at the proper time.

Still another object of my invention is to provide means for disabling the balking means which prevents engagement of the clutch elements whereby when the elements are not rotating, they may be freely engaged.

Other objects of my invention will become apparent from the following description taken in connection with the accompanying drawing, showing a single embodiment thereof, in which Figure 1 is a partial cross-sectional view of my novel clutch device as interposed between a change speed gearing and the propeller shaft of a power transmission mechanism; Figure 2 is a face view of the driving clutch member and associated parts, the upper half of the figure showing the balking ring removed; Figure 3 is a face view of the driven member of the clutch device; and Figure 4 is a developed view showing the relationship of the lugs on the balking ring and on the driven clutch member when the balking ring is active.

Although I have shown my clutch device combined with a change speed gearing, it will be understood that it may be used in other combinations or where it is desired to engage and disengage two rotating elements.

Referring to the drawing in detail, the portion of the change speed gearing disclosed comprises a driven shaft 1 journaled in a partition 2 of the housing 3 and extending into chamber 4 which is occupied by my novel clutch device. The change speed gearing has the usual counter-shaft 5 upon which is mounted a gear 6 in constant mesh with a gear 7 rotatably mounted upon the driven shaft 1. In the arrangement of gearing disclosed, gears 6 and 7 comprise the low speed gear ratio and is operable when gear 7 is connected to the driven shaft by a suitable clutch device, such as that shown at 8. The counter-shaft is also provided with a gear 9 adapted to cooperate with a slidable idler gear 10 which in turn is adapted to cooperate with gear 11 splined to the driven shaft. The idler gear, when in its operative relation with gears 9 and 11, produces the reverse geared drive of the change speed gearing. Idler gear 10 is suitably shifted by lever 12 controlled by the usual gear shift lever (not shown). The change speed gear also includes other speed ratios but these are not shown as they in no way affect the operation of my clutch device at the rear of the gearing and it is, therefore, believed unnecessary to disclose and describe their operation.

The end of the driven shaft 1 has secured thereto a driving member 13 of the clutch device provided with jaws or teeth 14. The propeller shaft 15, which is connected to the wheels of the vehicle, is journaled in the end of the housing 3 and extends into the end of the driving member 13 where it is provided with an additional bearing 16. The portion of the propeller shaft within the chamber 4 is formed with splines 17 upon which is slidably and non-rotatably mounted the driven member 18 of the clutch device and provided with jaws or teeth 19. The driving member 13 and the driven member 18 form the usual elements of a positive jaw clutch and when the teeth 14 and 19 are in interengaged relation, power may be transmitted from the driven shaft to the propeller shaft, and when they are in disengaged relation (as shown in Figure 1) the transmission of power is interrupted between the driven shaft of the gearing and the propeller shaft.

When the teeth of the driving and driven members are disengaged and it is desired to reengage them, it is necessary that they be rotating at substantially synchronous speed if a smooth engagement is accomplished. Synchronous speed between two shafts is so seldom attained and of such short duration that if it is desired to eliminate a clashing of the teeth, it is necessary to provide some means to prevent their engagement until synchronism is attained. In accordance with my invention I have provided means for preventing engagement of the teeth 14 and 19 and, therefore, the clashing of the teeth until synchronism has been attained.

The slidable driven member 18 is formed with alternate seating members 20 and 20', these members coinciding with teeth 19 on the driven member. The driving member 13 carries a ring 21 by means of suitable anti-friction balls 22 and this ring is adapted to be connected to the driving member by means of a one-way roller clutch 23 which permits the ring to be driven by the driving member 13 only in the direction in which the driven shaft 1 of the change speed gearing is normally driven—that is, the direction in which the driven shaft is rotating when the gearing is in a forward speed. The ring 21 has formed thereon a conical friction surface 24 which receives the annular portion 25 of a balking or synchronizer ring 26. This annular portion 25 has a conical friction surface for cooperation with the conical friction surface 24 and is held in cooperating position by means of the snap ring 27. The synchronizer ring 26 is formed with a plurality of spaced lugs 28 for cooperation with seatings 20 on the driven member and also with alternate lugs 29, of greater length than lugs 28. These latter lugs 29 are adapted to extend into the space between seatings 20 and 20' and are of a width less than the distance between the seatings 20 and 20' in order to permit the synchronizer ring to move relatively to the driven member sufficiently to allow the lugs 28 to either engage with the seatings 20 or to be received in the space between the seatings 20 and 20'.

The slidable driven member 18 is controlled by a suitable shifting fork 30 carried on shaft 31 in the housing. The shaft extends to the exterior housing and is provided with a suitable lever 32 controlled by a rod 33 which rod may be connected to a pedal such as that employed to control the fluid transmitter shown in my original application.

In the operation of my novel device, when it is desired to disengage the teeth 14 and 19 of the driving and driven members in order to disconnect the gearing from the propeller shaft when a change of gear ratio is to be effected, rod 33 is actuated and the slidable driven member 18 moved to the right by the shifting fork and into disengaged position, as shown in Figure 1. After the change of gear ratio has been effected and it is desired to reengage the clutch device, the rod 33 is released and by means of a spring acting on the rod (not shown) the driven member 18 is moved toward the driving member 13 to effect the engagement. At this time the driven member 18 will be rotating faster than the driving member 13, due to the speed of the vehicle, and is prevented from engagement with the latter by means of lugs 28 on the interposed synchronizer ring 26 which is rotated with and by the driven member by means of the lugs 29 so long as the speed of the driven member exceeds that of the driving member, the synchronizer ring freewheeling relatively to the driving member by means of the one-way roller clutch. The relative positions of the lugs on the balking ring and the driven clutch member 18 under the above conditions are as shown in Figure 4. Owing to the driven member being acted upon by the return spring (not shown) the conical friction surfaces of the synchronizer ring and the ring 21 are caused to be pressed together so that the two rings rotate freely relatively to the driving member. Upon accelerating the driving member through the driven shaft 1 of the change speed gearing (by speeding up the engine) and upon said coupling member tending to rotate faster than the driven member it will, due to the friction existing between the aforesaid conical friction surfaces of the ring 21 and the synchronizer ring 26, rotationally displace the latter so that the seatings 28, holding the driven coupling member in disengaged position, are rotationally displaced thereby allowing the driven coupling member to engage with the driving member under the influence of the return spring. Thus the teeth on the driven coupling member engage with those on the driving member in order to establish a positive bi-directional drive. Under the provision of the cooperating conical friction surfaces between the synchronizer ring and the ring 21, a friction slip is provided which is desirable and necessary in order to prevent any tendency of the driven coupling member to be rotated by the synchronizer ring through the one-way roller device, which might occur in the event the teeth do not engage at the time substantial synchronism is attained. It is thus seen that by providing both a one-way roller connection and a friction connection between the driving member and the synchronizer ring, there is no danger of power being transmitted from the driving member to the driven member through the one-way rollers and the synchronizer ring which would result in breakage of the mechanism. Also, because of this type of connection between the driving member and the synchronizer ring the wear on the friction connection is reduced to a minimum since no slippage takes place until the driving member picks up the ring 21 by means of the one-way roller connection.

When the reverse gear of the change speed gearing is employed it is desirable that the driving and driven members of the clutch device engage immediately after the reverse gear has been engaged. Since the reverse gear is generally engaged when the vehicle is stopped, it becomes necessary to provide means to displace the synchronizer ring to a position where the lugs thereof will permit free engagement of the teeth. The structure shown to accomplish this displacement of the synchronizer ring comprises a sleeve 34 slidably mounted on the seatings 20 and 20' of the driven member and splined against relative rotation thereto. This sleeve has formed thereon projecting portions provided with cam surfaces 35 arranged to co-act with cam surfaces 36 formed on lugs 29. The sleeve is adapted to be moved only by the reverse gear shifting lever 12 through a shifting fork 37 and a connecting rod 38.

When the gear shifting lever 12 is operated to engage the reverse idler gear 10, the sleeve 34 will be moved to the left and the synchronizer ring will be shifted rotationally by means of the cooperating cam surfaces 35 and 36 to a position where the lugs 28 on the synchronizer ring will be received between the seatings 20 and 20'. With the synchronizer ring in this position, when the slidable element is permitted to engage, the synchronizer ring will offer no impediment to its movement to the engaged position where the teeth 14 and 19 are in cooperative relation. When the gear shifting lever 12 is not operated, the sleeve 34 is held in the inoperative position, as shown in Figure 1, and the ring is not affected thereby.

Having fully described my invention, what I claim as new and desire to secure by Letters Patent of the United States is:

1. In a clutch device, a driving member, a driven member, said members being provided with interengaging parts and adapted for relative axial movement to permit engagement and disengagement of said interengaging parts, means for preventing engagement of said parts until the driving and driven members have attained substantially synchronous speeds, said preventing means comprising an element rotatable with one of said members of the clutch but capable of limited relative rotative movement thereto, cooperating means on said element and said last named clutch member for preventing said clutch member from engaging the other clutch member when said element is in one position and permitting the clutch members to engage when the element is in another position, connecting means between the said element and the other member of the clutch and comprising a one-way driving connection and a friction connection whereby said element may be moved to the position permitting engagement of the clutch members when said clutch members attain substantially synchronous speeds.

2. In a clutch device, a driving member, a driven member, said members being provided with interengaging parts and adapted for relative axial movement to permit engagement and disengagement of said interengaging parts, means for preventing engagement of said parts until the driving and driven members have attained substantially synchronous speeds, said preventing means comprising an element rotatable with one of said members of the clutch but capable of limited relative rotative movement thereto, cooperating means on said element and said last named clutch member for preventing said clutch member from engaging the other clutch member when said element is in one position and permitting the clutch members to engage when the element is in another position, a second element frictionally engageable by the first named element, and a one-way driving connection between the second element and the other member of the clutch whereby said second element may be moved by said other clutch member and thereby move the first element to the position permitting engagement of the clutch members when said clutch members attain substantially synchronous speeds.

3. In a positive clutch device, a driving member, a slidable driven member, said members being provided with interengaging teeth, means preventing engagement of the teeth until the members attain substantially synchronous speeds, said means comprising a synchronizer ring rotatable with the driven member but capable of limited relative rotation thereto, said synchronizer ring and driven member being provided with cooperating means whereby when the ring is in one position the teeth of the driven member are prevented from engaging the teeth of the driving member, a ring capable of frictionally driving the synchronizer ring, and a one-way roller connection between the ring and the driving member whereby the driving member is capable of frictionally moving the synchronizer ring to the position permitting engagement of the driven member with the driving member only when the driving member rotates at a slightly greater speed than the driven member.

4. In a positive clutch device, a driving member, a slidable driven member, said members being provided with interengaging teeth, means for preventing engagement of the teeth until the members attain substantially synchronous speeds, said means comprising a synchronizer ring carried by the driving member and rotatable with the driven member but capable of limited relative rotation thereto, said synchronizer ring and driven member being provided with cooperating engaging portions whereby when the ring is in one position the teeth of the driven member are prevented from engaging the teeth of the driving member and when in another position the teeth are permitted to engage, a ring mounted on the driving member and frictionally engaging the synchronizer ring, and a one-way roller connection between the driving member and the ring whereby the driving member may frictionally rotate the synchronizer ring through the ring to move the synchronizer to the position permitting the driven member to engage the driving member only when said members are rotating at substantially synchronous speeds.

5. In a clutch device, a driving member, a driven member, said members being provided with interengaging parts and adapted for relative axial movement to permit engagement and disengagement of said interengaging parts, means for preventing engagement of said parts until the driving and driven members have attained substantially synchronous speeds, said preventing means comprising an element rotatable with one of said members of the clutch but capable of limited relative rotative movement thereto and provided with means whereby in one position it prevents said member from engaging the other member and in the other position permits the engagement, a second element frictionally engageable by the first named element, a one-way driving connection between the second element and the other member of the clutch whereby said second element may be moved by said other clutch member and thereby move the first element to the position permitting engagement of the clutch members when the said clutch members attain substantially synchronous speeds, and means independent of the clutch members for moving the first named element to the position permitting engagement of the clutch members.

6. In apparatus of the class described, a driving shaft, a driven shaft, a clutch member rotatable with one of said shafts, a second clutch member rotatable with the other shaft, said clutch members having relative axial movement for permitting engagement and disengagement thereof, means for preventing reengagement of said clutch members after disengagement and until said members are rotating at substantially the same speed, said preventing means comprising an element connected for rotation with the first clutch member but capable of limited relative rotative movement thereto, means rotating with said first clutch member and cooperating with a portion of said element for preventing said clutch member from engaging the second clutch member when said element is in one of its relative rotative positions and permitting the clutch members to engage when the element is in another of its relative rotative positions, and means for moving the element by the second named clutch member and to the position permitting said clutch member to engage only when the second clutch member rotates at substantially the same speed as the first named clutch member, said means comprising a friction connection and a one-way driving connection in series between the element and the second clutch member.

PIERO MARIANO SALERNI.